US011234195B2

(12) United States Patent
Östman et al.

(10) Patent No.: US 11,234,195 B2
(45) Date of Patent: Jan. 25, 2022

(54) RADIO COMMUNICATIONS

(71) Applicant: Nordic Semiconductor ASA, Trondheim (NO)

(72) Inventors: Kjell Östman, Trondheim (NO); Hannu Talvitie, Trondheim (NO); Yrjö Kaipainen, Trondheim (NO); Juha Heikkilä, Trondheim (NO); Olli Närhi, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/955,687

(22) PCT Filed: Dec. 20, 2018

(86) PCT No.: PCT/EP2018/086377
§ 371 (c)(1),
(2) Date: Jun. 18, 2020

(87) PCT Pub. No.: WO2019/122231
PCT Pub. Date: Jun. 27, 2019

(65) Prior Publication Data
US 2020/0322891 A1 Oct. 8, 2020

(30) Foreign Application Priority Data
Dec. 20, 2017 (GB) .................... 1721436

(51) Int. Cl.
*H04W 52/02* (2009.01)
*G01S 19/34* (2010.01)
(52) U.S. Cl.
CPC ......... *H04W 52/0254* (2013.01); *G01S 19/34* (2013.01); *H04W 52/0216* (2013.01)

(58) Field of Classification Search
CPC ........ H04W 52/0254; H04W 52/0216; H04W 64/00; H04W 4/70; H04W 88/06;
(Continued)

(56) References Cited

U.S. PATENT DOCUMENTS 6,448,927 B1  9/2002  Ishigaki et al.
8,054,221 B1  11/2011  Luong et al.
(Continued)

FOREIGN PATENT DOCUMENTS

WO   WO 2013/020442 A1   2/2013
WO   WO 2014/163837 A1   10/2014

OTHER PUBLICATIONS

IPO Search Report under Section 17(5) for GB 1721436.2, dated Jun. 1, 2018, 6 pages.
(Continued)

*Primary Examiner* — Diane D Mizrahi
(74) *Attorney, Agent, or Firm* — Klarquist Sparkman, LLP

(57) ABSTRACT

A radio transceiver comprises one or more hardware resources, e.g. a processor; memory; a peripheral device; an algorithmic hardware accelerator; and/or a radio frequency component. A cellular communication radio is operable in an active mode in which it has access to the one or more hardware resources for transmitting and/or receiving cellular communication signals, and an inactive mode in which it does not. A global navigation satellite systems radio, arranged to use the one or more hardware resources to receive positioning signals, has access to the one or more hardware resources only when the cellular communication radio is operated in the inactive mode.

12 Claims, 5 Drawing Sheets

(58) Field of Classification Search
CPC ......... H04W 52/0241; H04W 52/0229; H04W 52/0235; G01S 19/34; G01S 19/36; Y02D 30/70

See application file for complete search history.

(56) References Cited

U.S. PATENT DOCUMENTS

| | | |
|---|---|---|
| 2003/0054775 A1 | 3/2003 | Eaves et al. |
| 2003/0100333 A1 | 5/2003 | Standke et al. |
| 2009/0322597 A1 | 12/2009 | Herrerro et al. |
| 2010/0248799 A1 | 9/2010 | Lum et al. |
| 2014/0139380 A1 | 5/2014 | Ouyang et al. |
| 2020/0336258 A1* | 10/2020 | Zhu ..................... H04L 1/0076 |

OTHER PUBLICATIONS

International Search Report and Written Opinion for PCT/EP2018/086377, dated Feb. 12, 2019, 14 pages.

\* cited by examiner

RADIO COMMUNICATIONS

CROSS REFERENCE TO RELATED APPLICATIONS

This is the U.S. National Stage of International Application No. PCT/EP2018/086377, filed Dec. 20, 2018, which was published in English under PCT Article 21(2), which in turn claims the benefit of Great Britain Application No. 1721436.2, filed Dec. 20, 2017.

TECHNICAL FIELD

The present invention relates to sharing hardware resources between cellular communication radio systems such as Long Term Evolution (LTE) and global navigation satellite systems (GNSS).

BACKGROUND

Throughout the course of the past few decades, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

More recently, the Long Term Evolution (LTE) network, a fourth generation (or "4G") network standard specified by the $3^{rd}$ Generation Partnership Project (3GPP), has gained popularity due to its relatively high uplink and downlink speeds and larger network capacity compared to earlier 2G and 3G networks. More accurately, LTE is the access part of the Evolved Packet System (EPS), a purely Internet Protocol (IP) based communication technology in which both real-time services (e.g. voice) and data services are carried by the IP protocol. The air interface of LTE is often referred to as Evolved UMTS Terrestrial Radio Access (or "E-UTRA").

However, while "classic" LTE connections are becoming increasingly prevalent in the telecommunications industry, further developments to the communication standard are being made in order to facilitate the so-called "Internet of Things" (IoT), a common name for the inter-networking of physical devices, sometimes called "smart devices", providing physical objects that may not have been connected to any network in the past with the ability to communicate with other physical and/or virtual objects. Such smart devices include: vehicles; buildings; household appliances, lighting, and heating (e.g. for home automation); and medical devices. Such smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices, thus providing "machine-to-machine" (or "machine type") communication. However, the development of the LTE standards makes it more practical for them to connect directly to the cellular network.

3GPP have specified two versions of LTE for such purposes in Release 13 of the LTE standard. The first of these is called "NarrowBand IoT" (NB-IoT), sometimes referred to as "LTE Cat NB1", and the second is called "enhanced Machine Type Communication" (eMTC), sometimes referred to as "LTE Cat M1". It is envisaged that the number of devices that utilise at least one of these standards for IoT purposes will grow dramatically in the near future.

From a communications perspective, LTE standards (including NB-IoT and eMTC) use orthogonal frequency division multiple access (OFDMA) as the basis for allocating network resources. This allows the available bandwidth between to be shared between user equipment (UE) that accesses the network in a given cell, provided by a base station, referred to in LTE as an "enhanced node B", "eNodeB", or simply "eNB". OFDMA is a multi-user variant of orthogonal division multiplexing (OFDM), a multiplexing scheme in which the total bandwidth is divided into a number of non-overlapping sub-bands, each having its own sub-carrier frequency.

In OFDM, unlike other frequency division multiplexing (FDM) schemes, each of these sub-carriers are orthogonal to one another such that cross-talk between sub-bands is ideally eliminated and removing the need for inter-carrier guard bands.

It is also desirable for IoT devices that employ NB-IoT or eMTC to be equipped with global navigation satellite systems (GNSS) functionality in order to use location services. GNSS services may be used by the device to determine its current location which may, for example, then be reported to an external server or may be used internally by the device.

Typically, a device provided with both LTE and GNSS capabilities will have dedicated hardware for each of these. A non-exhaustive list of the hardware that each of these radios is provided with includes: processors, memory, peripherals, algorithmic hardware accelerators, and radio frequency components.

SUMMARY OF THE INVENTION

When viewed from a first aspect, the present invention provides a radio transceiver comprising:
  one or more hardware resources, wherein the one or more hardware resources comprises at least one from the group comprising: a processor; memory; a peripheral device; an algorithmic hardware accelerator; and a radio frequency component;
  a cellular communication radio, operable in an active mode wherein the cellular communication radio has access to the one or more hardware resources for transmitting and/or receiving cellular communication signals, and an inactive mode wherein the cellular communication radio does not access the one or more hardware resources; and a global navigation satellite systems radio, arranged to access the one or more hardware resources only when the cellular communication radio is operated in the inactive mode, wherein the global navigation satellite systems radio is arranged to use the one or more hardware resources to receive positioning signals.

This first aspect of the invention extends to a method of operating a radio transceiver comprising:
  one or more hardware resources, wherein the one or more hardware resources comprises at least one from the group comprising: a processor; memory;
  a peripheral device; an algorithmic hardware accelerator; and a radio frequency component;
  a cellular communication radio, operable in an active mode wherein the cellular communication radio has access to the one or more hardware resources for transmitting and/or receiving cellular communication signals, and an inactive mode wherein the cellular communication radio does not access the one or more hardware resources; and a global navigation satellite systems radio circuit portion;
  wherein the method comprises:
    selectably providing the global navigation satellite systems radio with access to the one or more hardware resources only when the cellular communication radio is in the inactive mode.

Thus it will be appreciated by those skilled in the art that embodiments of the present invention provide a mechanism for sharing hardware resources between both cellular and GNSS radio systems. In particular, priority is given to the cellular communication radio and the GNSS radio gets access to the shared hardware resources only when the cellular communication radio does not need them. The Applicant has appreciated that, while this may impose a limit on the accuracy with which the GNSS radio can acquire the radio transceiver's location, sharing hardware resources between the radios in this way may result in considerable savings in power consumption, together with a reduced bill-of-materials by virtue of using less physical hardware to implement the radio transceiver. The hardware resources that are shared may, by way of example only, include LTE Layer 1 (Physical Layer) resources such as processors and/or hardware accelerators. The hardware resources may also include an antenna, RF front-end clock, and/or clock sources or crystal oscillators.

Allocation of the shared hardware resources may, by way of example, be carried out by a modem host control processor, which is provided with information regarding the status of the cellular radio system such as the timing of idle or sleep states. Such an approach is advantageous because it is flexible and provides the opportunity for the underlying firmware to be upgraded, e.g. using over-the-air (OTA) updates.

Any idle periods in which the cellular radio is inactive provide an opportunity for the GNSS radio to obtain a location fix, using either hot acquisition (using a last calculated position and the known satellites that were in view at the time together with an almanac and the current time to obtain a fix using prior knowledge), warm acquisition (similar to hot acquisition but without knowledge of which satellites were in view at the time of the last calculated position), cold acquisition (acquiring a fix with no almanac and no prior knowledge of location, satellite location, etc.), or using continuous tracking techniques. It will of course be appreciated that the GNSS radio may not necessarily make use the entire duration of each idle period afforded to it by the cellular radio, and it may not necessarily make use of every idle period that arises (i.e. there may be times when neither radio is accessing the shared hardware resources), however, in accordance with the invention, these idle periods may be the only times in which the GNSS radio may access the shared hardware resources.

In some embodiments, the radio transceiver is arranged to use the cellular communication radio to assist the global navigation satellite systems radio in acquiring a location fix. Those skilled in the art will appreciate that assisted GNSS (or A-GNSS) is an advantageous arrangement in which the cellular communication radio is used to obtain information about the orbit of one or more navigation satellites and then provide that information to the GNSS radio so that it can acquire a fix. The orbit information or 'assistance data' may be stored in memory that is shared between the cellular and global navigation satellite systems radios.

While it will be appreciated that the present invention could be applied to a variety of cellular communication networks, in preferred embodiments the cellular communication radio is arranged to communicate using LTE and the cellular communication signals comprise LTE signals. It will be understood by those skilled in the art that the term "LTE" as used herein in relation to the various embodiments of the invention refers to all variants that are specified by 3GPP, including but not limited to "classic" LTE, NB-IoT and eMTC. In such embodiments, the LTE radio will typically have a number of idle periods in which the GNSS radio could have access to the shared hardware resources.

Examples of such idle periods in LTE are the discontinuous reception (DRX), extended DRX (eDRX), and power saving mode (PSM) modes of operation. These idle periods may provide gaps of milliseconds to days in which the LTE radio is not in use.

For example, under normal 'classic' LTE operation or MTC operation, the UE typically checks the physical downlink control channel (PDCCH) frequently for paging messages (paging radio network temporary identifier or "P-RNTI" messages), however when operated in the DRX mode, the UE may instead check the PDCCH for P-RNTI messages less frequently. This may, subject to any further needs of the LTE radio, provide a gap in which the LTE radio is inactive and the GNSS radio could make use of the shared resources.

Those skilled in the art will appreciate that there are two types of DRX: Idle mode DRX and Connected mode DRX (C-DRX). The P-RNTI messages referred to above are typically monitored only in the radio resource control (RRC) idle state, with a typical period between 320 ms to 2.56 s.

Under eMTC operation, an eMTC IoT device would monitor the MTC physical downlink control channel (MPDCCH) while under NB-IoT operation, an NB-IoT device would monitor the narrowband physical downlink control channel (NPDCCH). The eDRX scheme introduced by eMTC allows a UE to tell the network that it would like to be inactive (i.e. idle) for a number of "hyper-frames", where each hyper-frame is 10.24 s long (i.e. 1024 subframes), where the maximum number of hyper-frames that the UE can request is set by the network. In general, the maximum number of hyper-frames that the UE can request should equate to at least 40 minutes of idle time. This may also provide the GNSS radio with an opportunity to make use of the shared hardware resources. Thus in eDRX, the P-RNTI messages may be monitored with a period between 10.24 s and approximately 40 minutes.

In the RRC connected state, an eMTC UE may monitor for cell radio network temporary identifier (C-RNTI) messages every 1-10 ms in the non-DRX mode; every 2-640 ms in connected mode DRX; and up to every 10.24 s in connected mode eDRX.

Further to this, the PSM scheme specified by 3GPP allows a UE to inform the network that it intends to become inactive for an indefinite period of time. The UE may wake up intermittently (e.g. to transmit data), after which it may provide a short reception window (e.g. for 4 frames) in which it can be reached by the network before returning to the inactive state. Depending on how often the UE wakes up from PSM, the GNSS radio could potentially have relatively long periods of time in which it could access the shared hardware resources and obtain a fix.

In some embodiments, the cellular communication radio is arranged to switch between the active and inactive modes periodically. It will be appreciated that, in accordance with such embodiments, the radio transceiver is subject to a duty cycled operation, where there is a periodic schedule with a particular duty cycled that dictates one or more slots in every period in which the GNSS radio may have access to the shared hardware resources. For example, if the GNSS radio is arranged to make use of the gaps between receptions in the DRX mode of the LTE radio as explained above, the UE may wake up to check the PDCCH periodically at a predetermined frequency and so the times that the GNSS has the shared hardware resources available to it are also periodic.

Additionally or alternatively, in some embodiments, the cellular communication radio is arranged to switch between the active and inactive modes at scheduled times. The schedule followed by the cellular radio may, in some embodiments, be known by a processor within the radio transceiver. In such embodiments, the processor may have prior knowledge of scheduled transmission and reception timings. This may also be applied in some cases where the GNSS is arranged to use the hardware resources while the LTE radio is operating in PSM—if the LTE radio is only going to wake up on an ad hoc basis, the times that it will need the hardware resources may be known in advance (even if they are not periodic) and the GNSS radio can be provided with access to the shared hardware resources between these wake ups as required. This may advantageously allow the GNSS module to operate more efficiently as it knows in advance when it will be allowed access to the shared hardware resources rather than making attempts (that might be denied) on an ad hoc basis.

In some embodiments, the radio transceiver comprises a memory arranged to store instructions for carrying out communications and a memory management module, wherein the memory management module is arranged to:

store instructions for carrying out cellular communication when the cellular communication radio is in the active mode; and store instructions for carrying out global navigation satellite systems communication when the cellular communication radio is in the inactive mode. The instructions stored in this memory may be accessed and executed by a processor, where the same processor may be used for performing both cellular and GNSS operations. This processor may, by way of example only, be an LTE Layer 1 processor. In some such embodiments, the memory management module is arranged to store the instructions for carrying out global navigation satellite systems communication only when the global navigation satellite systems radio requires access to the one or more hardware resources.

However, in some alternative embodiments, the radio transceiver comprises a memory arranged to store instructions for carrying out communications and a memory management module, wherein the memory management module is arranged to store simultaneously instructions for carrying out cellular communication and for carrying out global navigation satellite systems communication. Those skilled in the art will appreciate that this increases the local program memory requirements of the radio transceiver (in order to store both sets of instructions at the same time), but may advantageously increase the response time when switching between communication types because the memory does not need reloading.

BRIEF DESCRIPTION OF DRAWINGS

Certain embodiments of the invention will now be described with reference to the accompanying drawings in which.

DETAILED DESCRIPTION

Figure 1:
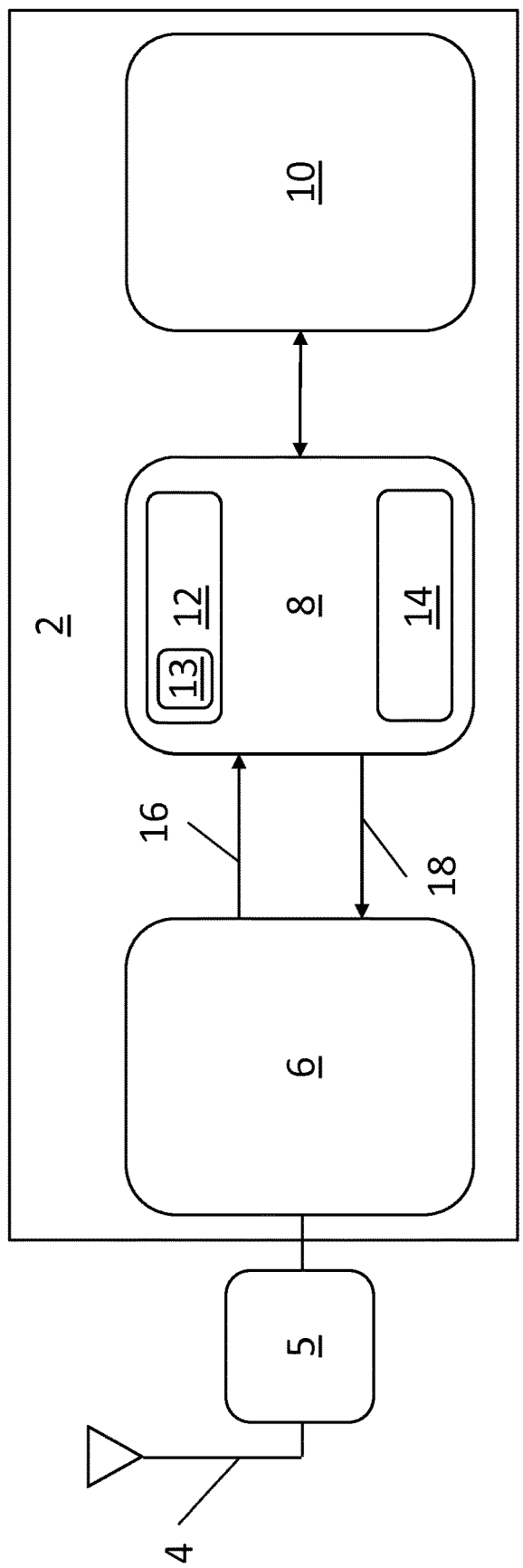
FIG. 1 is a block diagram of a multi-radio device in accordance with an embodiment of the present invention.

FIG. 1 is a block diagram of a multi-radio transceiver device 2 in accordance with an embodiment of the present invention. The multi-radio transceiver device 2 which, for example, may be located within a smartphone, a tablet, or an IoT device, is connected to an antenna 4, where the antenna 4 is used for the transmission and reception of RF signals. The multi-radio device 2 is arranged to implement both cellular communication radio and GNSS radio functionality. In this particular embodiment, the cellular radio is an LTE radio.

The LTE/GNSS multi-radio device 2 comprises: a radio frequency (RF) transceiver 6; a baseband processing module 8; and main memory 10. The baseband processing module 8 comprises a control processor 12 and one or more peripherals 14. These peripherals 14 typically include timers, radio hardware accelerators, and general purpose input/output (GPIO) interfaces.

The RF transceiver 6 is connected to the antenna 4 via an RF front-end 5 and is arranged to exchange receive data 16 and transmit data 18 with the baseband processing module 8 during reception and transmission windows respectively. This transmit data 18 will typically be data for LTE transmissions while the receive data 16 may be either incoming LTE data or GNSS signals, depending on which mode the radio 2 is in.

The processor 12 is typically the host control processor of the LTE and GNSS modems that is typically arranged to run general housekeeping functions for the system and to run at least part of the radio protocols (usually the higher layers). The lower layers of the protocol (e.g. the Physical Layer or 'Layer 1') may typically be run on baseband hardware which may or may not include one or more further processors (not shown). This processor 12 may be provided with information regarding the status of the LTE operations such as the timing of idle or sleep states and use this information for the allocation of shared resources.

The processor 12 is arranged to carry out either LTE operations or GNSS operations at any given moment in time, depending on which mode the radio 2 is currently being operated in, as will described in further detail below with reference to FIG. 2. The processor 12 may be loaded with software programs for each of the radios, i.e. it can execute software functions related to LTE or GNSS as appropriate. The software is stored in the memory 10 and accessed by the processor 12. The processor 12 includes a controller module 13 that is arranged, among other functions typical of such a controller, to arbitrate requests, control timings, and load software. It will, of course, be appreciated that this controller module 13 may be a software function or task running on the processor 12 rather than a dedicated hardware module itself.

In some arrangements, the local memory of the processor 12 may be loaded with both the LTE software and the GNSS software simultaneously, such that it can switch between carrying out LTE operations and GNSS operations on-the-fly.

However, in other arrangements, the local memory of the processor 12 (and/or any further processors in the baseband hardware as discussed above) may be loaded only with one of the LTE software or the GNSS software. In such arrangements, the processor 12 may load the appropriate software from memory 10 for each operation. For example, in an LTE idle period, the processor 12 may load the GNSS software from memory in order to carry out one or more GNSS operations, before re-loading the LTE software from memory 10 in order to resume LTE operations. This process will be described in further detail below with reference to FIG. 2.

It will be appreciated that processor and memory resource limitations may determine whether both the LTE and GNSS software can both be loaded into the processor 12 at the same time or whether alternation is required.

Figure 2:
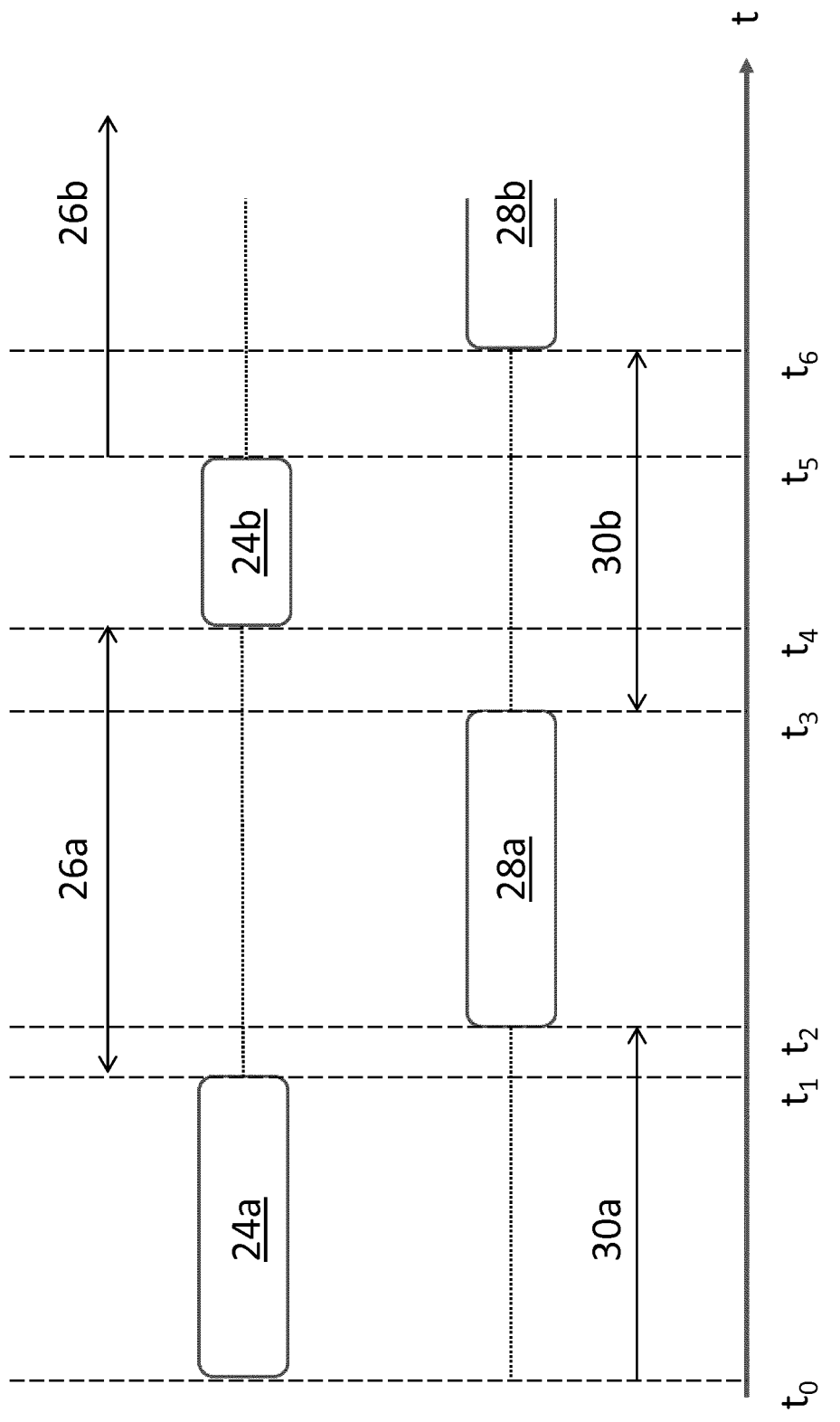
FIG. 2 is a timing diagram the typical operation of the multi-radio device of FIG. 1.

FIG. 2 is a timing diagram the typical operation of the device of FIG. 1. The timing diagram shows the transmission and reception operations of the LTE radio 20 and the reception operations of the GNSS radio 22.

As can be seen in FIG. 2, the LTE radio 20 and the GNSS radio 22 are arranged such that their respective operations never take place at the same time, i.e. the multi-radio device 2 utilises time-division multiplexing in order to allocate timeslots to each of the radios, where priority is given to the LTE radio 20.

Initially, at time $t_0$, the LTE radio 20 is performing a transmission/reception (or "tx/rx") operation 24*a* and so has sole access to the RF transceiver 6 (and by extension, the antenna 4) processor 12, memory 10, and peripherals 14. The LTE radio 20 uses these resources to send and/or receive data over the LTE network.

The LTE radio 20 continues to make use of these resources until $t_1$, at which point the LTE radio 20 ceases performing tx/rx operations. The LTE radio 20 then enters an idle period 26*a*, during which time the resources are made available to the GNSS radio 22, which had otherwise been in an idle period 30*a* of its own while the LTE radio 20 required the resources for its tx/rx operation 24*a*.

While the GNSS radio 22 does not immediately initiate a receive (or "rx") operation at t1, the resources are available to it from $t_1$. However, at $t_2$, the GNSS radio 22 begins an rx operation 28*a*, i.e. during the idle period 26*a* of the LTE radio 20. During this time, the GNSS radio is provided with an opportunity for the GNSS radio to obtain a location fix, using either hot acquisition, warm acquisition, cold acquisition, or using continuous tracking techniques. At time $t_3$ the GNSS radio 22 ceases its rx operation 28*a* and enters another idle period 30*b*.

At $t_4$, the LTE radio 20 initiates a new tx/rx operation 24*b*, once again blocking the GNSS radio 22 from accessing the shared hardware resources. This tx/rx operation 24*b* continues until all scheduled transmissions and/or receptions are complete at $t_5$, at which time the LTE radio 20 enters another idle period 26*b* in which the GNSS radio 22 is again able to access the shared hardware resources. The GNSS radio 22 begins a further rx operation 28*b* at t6, during the idle period 26*b* of the LTE radio 20.

Figure 3:
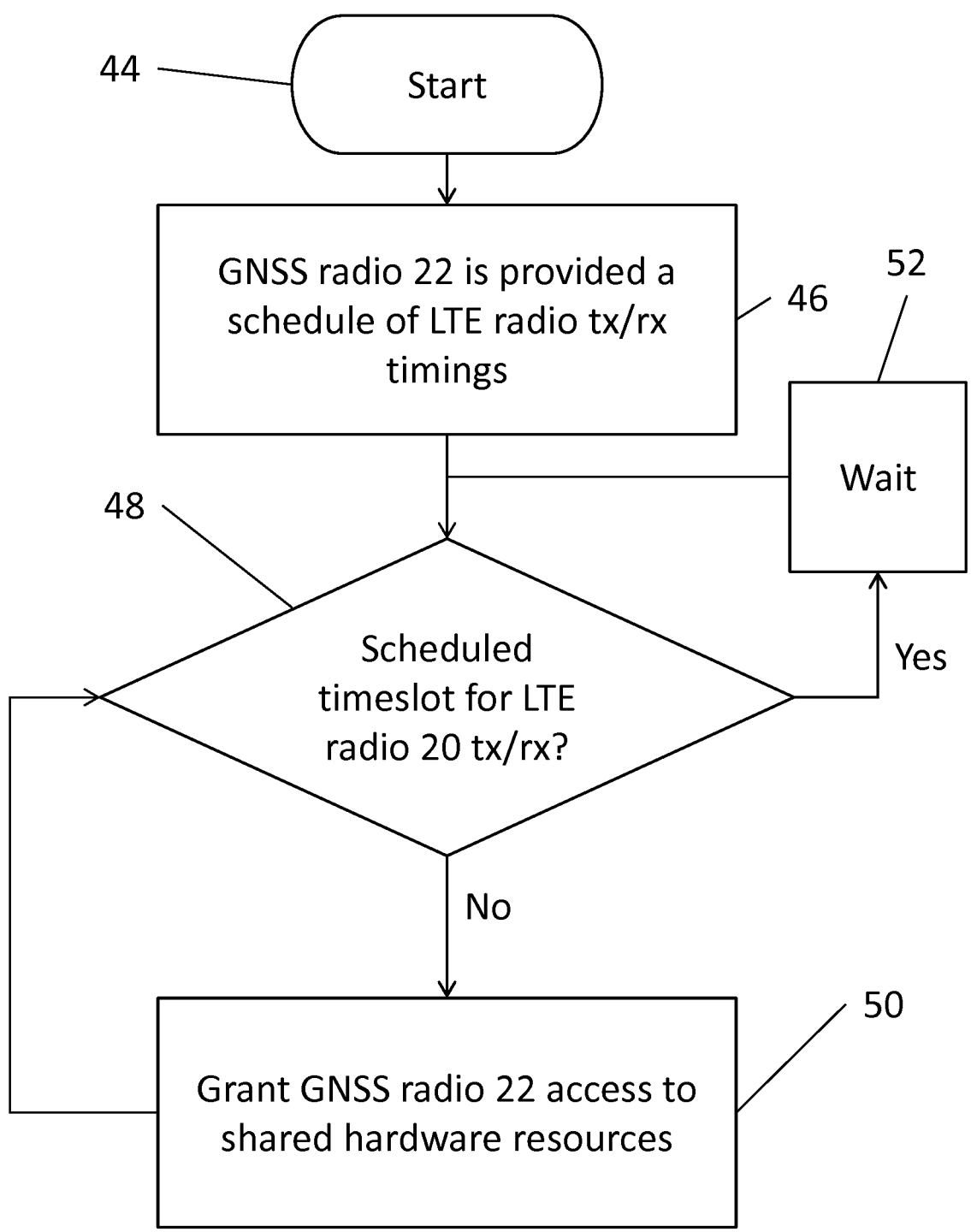
FIG. 3 is a flowchart that shows the operation of the multi-radio device of FIG. 1 when the GNSS radio requests access to the shared hardware resources.

FIG. 3 is a flowchart that shows the operation of the multi-radio device of FIG. 1 when the GNSS radio 22 is provided with a schedule of when it may access the shared hardware resources. In this exemplary embodiment, both the LTE and GNSS software is loaded from the memory 10. The process shown in the flowchart of FIG. 3 is initiated at step 44 and the GNSS radio 22 is provided with a schedule of the tx/rx timings of the LTE radio 20 at step 46.

At step 48, a check is made to determine whether or not the LTE radio 20 has a tx/rx operation 24*a*, 24*b* scheduled and/or when the LTE radio 20 will be in idle mode. If no tx/rx operation 24*a*, 24*b* for the LTE radio 20 is scheduled, the GNSS radio 22 is granted access to the shared hardware resources at step 50, allowing the GNSS radio 22 to perform its rx operations 28*a*, 28*b* until it is determined 48 that the LTE radio 20 has a tx/rx operation 24*a*, 24*b* scheduled.

However, if the LTE radio 20 does have a tx/rx operation 24*a*, 24*b* scheduled, the GNSS radio 22 waits 52 until a tx/rx operation 24*a*, 24*b* is no longer scheduled. The amount of time the GNSS radio 22 waits 52 is based on the schedule provided 46.

Figure 4:
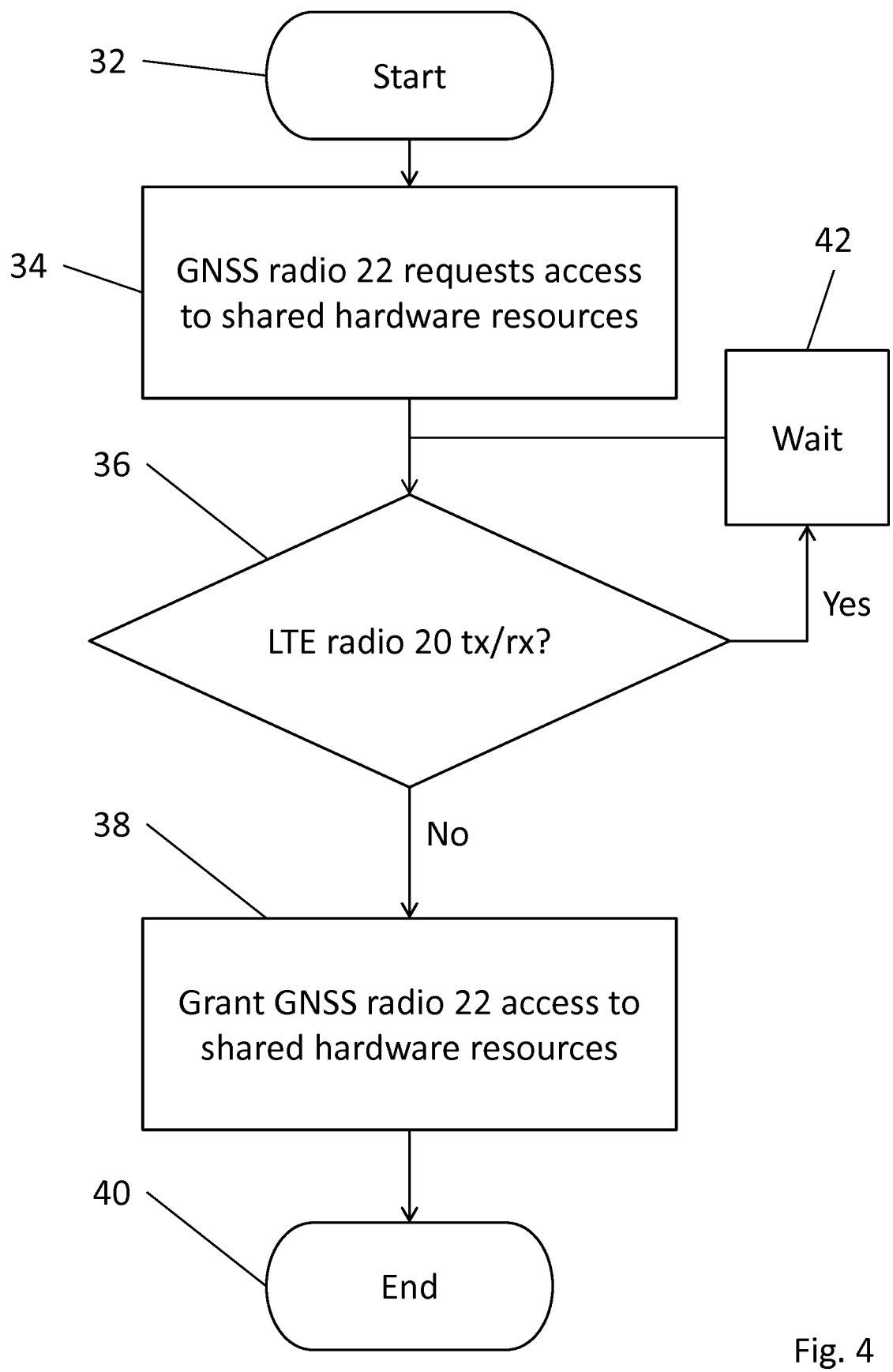
FIG. 4 is a flowchart that shows the operation of the multi-radio device of FIG. 1 when the GNSS radio requests is provided with a schedule of when it may access the shared hardware resources.

FIG. 4 is a flowchart that shows the operation of the multi-radio device 2 of FIG. 1 when the GNSS radio 22 requests access to the shared hardware resources. In this exemplary embodiment, both the LTE and GNSS software is loaded from the memory 10. The process shown in the flowchart of FIG. 3 is initiated at step 32 and the GNSS radio 22 requests access to the shared hardware resources at step 34.

At step 36, a check is made to determine whether or not the LTE radio 20 is currently performing a tx/rx operation 24*a*, 24*b*. If the LTE radio 20 is not performing a tx/rx operation 24*a*, 24*b*, the GNSS radio 22 is granted access to the shared hardware resources at step 36, allowing the GNSS radio 22 to perform its rx operations 28*a*, 28*b*, and the process is ended 40.

However, if the LTE radio 20 is performing a tx/rx operation 24*a*, 24*b*, the GNSS radio 22 waits 42 for a period of time before checking 36 again whether the LTE radio 20 still requires access to the shared hardware resources. The amount of time the GNSS radio 22 waits 42 may be based on a predetermined wait time (e.g. a certain number of clock cycles of a timer peripheral), or it may be informed by the LTE radio 20 (e.g. a master such as a modem host control processor) as to how long it should wait before attempting to perform an rx operation 28*a*, 28*b*.

In some embodiments, the LTE radio 20 is provided with means to take over control from the GNSS radio 22 (e.g. immediately) if it requires use of the shared hardware resources while such resources are allocated to the GNSS radio 22—i.e. the LTE radio 20 is given higher priority than the GNSS radio 22. In other arrangements the two systems could carry out a negotiation-based sequence. This may, by way of example only, provide the GNSS radio 22 with a certain amount of 'guard time', or by pre-warning the GNSS radio 22 that the LTE radio 20 intends to take over.

Figure 5:
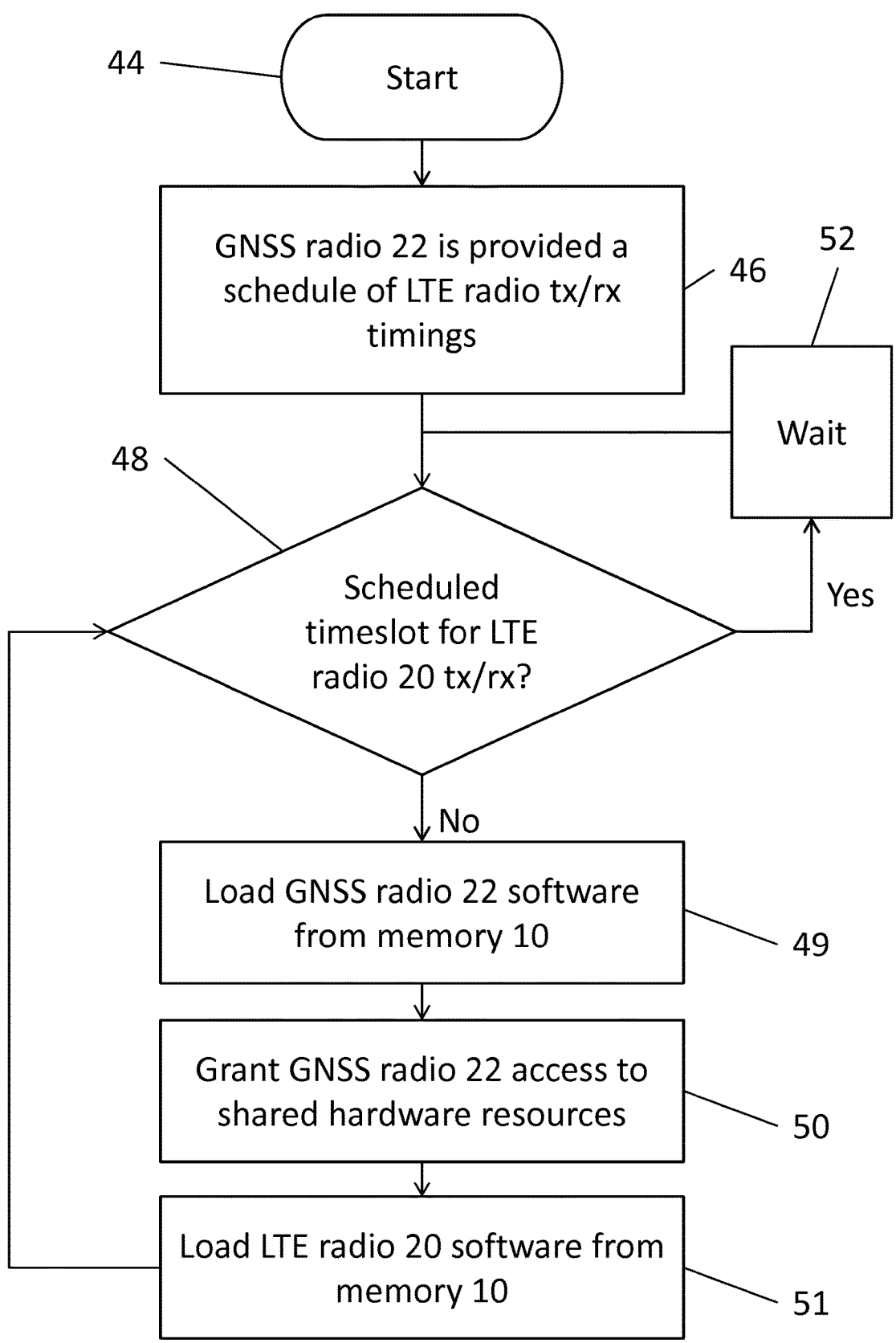
FIG. 5 is a flowchart that shows the operation of the multi-radio device of FIG. 1 where the radio software loaded from memory is alternated.

FIG. 5 is a flowchart that shows the operation of the multi-radio device of FIG. 1 where the radio software loaded from memory is alternated. Similarly to the operation described with reference to FIG. 3, the flowchart of FIG. 5 shows the operation of the multi-radio device of FIG. 1 when the GNSS radio 22 is provided with a schedule of when it may access the shared hardware resources, where like reference numerals indicate like elements. However, unlike the operation described with reference to FIG. 3, the processor 12 (and/or any additional baseband processors as outlined previously) is only provided with the software for one of the radios 20, 22 at a time.

In this case, prior to the step 50 of granting the GNSS radio 50 access to the shared hardware resources, the GNSS radio 22 software is loaded from memory 10 at step 49 such that the processor 12 can carry out GNSS functions.

Once the time allocated to the GNSS radio 22 for accessing the shared hardware resources ends, the LTE radio 20 software is loaded from memory 10 at step 51 such that the processor 12 (and/or any additional baseband processors as outlined previously) can resume carrying out LTE functions at its next designated tx/rx slot.

Thus it will be appreciated by those skilled in the art that embodiments of the present invention provide a mechanism for sharing hardware resources between a cellular radio (e.g. an LTE radio) and a GNSS radio collocated within a radio transceiver, reducing the overall power consumption and bill-of-materials associated with the radio transceiver. Those skilled in the art will appreciate that the specific embodiments described herein are merely exemplary and that many variants within the scope of the invention are envisaged.

The invention claimed is:

1. A radio transceiver comprising:
one or more hardware resources, wherein the one or more hardware resources comprises at least one from the group comprising: a processor; memory; a peripheral device; an algorithmic hardware accelerator; and a radio frequency component;
a cellular communication radio, operable in an active mode wherein the cellular communication radio has access to the one or more hardware resources for transmitting and/or receiving cellular communication signals, and an inactive mode wherein the cellular communication radio does not access the one or more hardware resources;
a global navigation satellite systems radio, arranged to access the one or more hardware resources only when the cellular communication radio is operated in the inactive mode, wherein the global navigation satellite systems radio is arranged to use the one or more hardware resources to receive positioning signals;
a memory arranged to store instructions for carrying out communications; and
a memory management module;
wherein the memory management module is arranged to:
store instructions for carrying out cellular communication when the cellular communication radio is in the active mode; and
store instructions for carrying out global navigation satellite systems communication when the cellular communication radio is in the inactive mode.

2. The radio transceiver as claimed in claim 1, further arranged to use the cellular communication radio to assist the global navigation satellite systems radio in acquiring a location fix.

3. The radio transceiver as claimed in claim 1, wherein the cellular communication radio is arranged to communicate using LTE and the cellular communication signals comprise LTE signals.

4. The radio transceiver as claimed in claim 1, wherein the cellular communication radio is arranged to switch between the active and inactive modes periodically.

5. The radio transceiver as claimed in claim 1, wherein the cellular communication radio is arranged to switch between the active and inactive modes at scheduled times.

6. The radio transceiver as claimed in claim 1, wherein the memory management module is arranged to store the instructions for carrying out global navigation satellite systems communication only when the global navigation satellite systems radio requires access to the one or more hardware resources.

7. A method of operating a radio transceiver comprising:
one or more hardware resources, wherein the one or more hardware resources comprises at least one from the group comprising: a processor; memory; a peripheral device; an algorithmic hardware accelerator; and a radio frequency component;
a cellular communication radio, operable in an active mode wherein the cellular communication radio has access to the one or more hardware resources for transmitting and/or receiving cellular communication signals, and an inactive mode wherein the cellular communication radio does not access the one or more hardware resources;
a global navigation satellite systems radio circuit portion;
a memory arranged to store instructions for carrying out communications; and
a memory management module;
wherein the method comprises:
selectably providing the global navigation satellite systems radio with access to the one or more hardware resources only when the cellular communication radio is in the inactive mode;
storing in the memory management module instructions for carrying out cellular communication when the cellular communication radio is in the active mode; and
storing in the memory management module instructions for carrying out global navigation satellite systems communication when the cellular communication radio is in the inactive mode.

8. The method as claimed in claim 7, further comprising using the cellular communication radio to assist the global navigation satellite systems radio in acquiring a location fix.

9. The method as claimed in claim 7, wherein the cellular communication radio is arranged to communicate using LTE and the cellular communication signals comprise LTE signals.

10. The method as claimed in claim 7, further comprising switching between the active and inactive modes periodically.

11. The method as claimed in claim 7, further comprising switching between the active and inactive modes at scheduled times.

12. The method as claimed in claim 7, further comprising storing in the memory management module instructions for carrying out global navigation satellite systems communication only when the global navigation satellite systems radio requires access to the one or more hardware resources.

\* \* \* \* \*